United States Patent
Jennek et al.

(10) Patent No.: US 10,040,435 B2
(45) Date of Patent: Aug. 7, 2018

(54) METHOD FOR BRAKING A RAIL VEHICLE AND OPEN-LOOP AND/OR CLOSED-LOOP CONTROL DEVICE FOR A BRAKE SYSTEM

(71) Applicants: SIEMENS AKTIENGESELLSCHAFT, Munich (DE); Carolin Schweisfurth, Gilching (DE); Patrick Schweisfurth, Gilching (DE)

(72) Inventors: Steffen Jennek, Neuried (DE); Joerg Nikolaus Schweisfurth; Helmut Stoff, Warngau (DE)

(73) Assignee: Siemens Aktiengesellschaft, Munich (DE)

( * ) Notice: Subject to any disclaimer, the term of this patent is extended or adjusted under 35 U.S.C. 154(b) by 26 days.

(21) Appl. No.: 15/025,325

(22) PCT Filed: Sep. 26, 2013

(86) PCT No.: PCT/EP2013/070077
§ 371 (c)(1),
(2) Date: Mar. 28, 2016

(87) PCT Pub. No.: WO2015/043636
PCT Pub. Date: Apr. 2, 2015

(65) Prior Publication Data
US 2016/0214584 A1    Jul. 28, 2016

(51) Int. Cl.
*B60T 8/17* (2006.01)
(52) U.S. Cl.
CPC .................. *B60T 8/1705* (2013.01)
(58) Field of Classification Search
CPC .................................................. B60T 8/1705
See application file for complete search history.

(56) References Cited

U.S. PATENT DOCUMENTS 4,131,325 A * 12/1978 Bayliss ................. B60T 8/1705
188/181 C
4,344,138 A * 8/1982 Frasier .................. B60T 8/1705
105/61
(Continued)

FOREIGN PATENT DOCUMENTS

CN      101370696 A      2/2009
CN      102143868 A      8/2011
(Continued)

OTHER PUBLICATIONS

Machine translation of DE 102008045712 retrieved from Espacenet on Jul. 24, 2017.*

*Primary Examiner* — Thomas Ingram
(74) *Attorney, Agent, or Firm* — Laurence Greenberg; Werner Stemer; Ralph Locher

(57) ABSTRACT

A method for braking a rail vehicle with a brake system includes providing an open-loop and/or closed-loop control device having a wheel slide protection control unit for ensuring a predefined coefficient of adhesion between the wheels of the rail vehicle and the rail, in which brake demand signals of different origin are taken into account by the open-loop and/or closed-loop control device. A slide protection function of the wheel slide protection control unit is deactivated for braking that is free of slide protection when at least two brake demand signals having different origin and having a brake demand which exceeds a specified deceleration limit, are present at the same time. A corresponding open-loop and/or closed-loop control device for a brake system and such a brake system are also provided.

11 Claims, 2 Drawing Sheets

(56) References Cited

U.S. PATENT DOCUMENTS

| | | | |
|---|---|---|---|
| 5,788,339 A | 8/1998 | Wood et al. | |
| 9,079,591 B2 | 7/2015 | Jennek et al. | |
| 2005/0006948 A1* | 1/2005 | Friesen | B60T 8/1705 303/20 |
| 2008/0309155 A1 | 12/2008 | Audrezet et al. | |
| 2010/0252378 A1* | 10/2010 | Hilberer | B60T 7/107 188/106 F |
| 2014/0217810 A1 | 8/2014 | Herden et al. | |
| 2015/0081145 A1 | 3/2015 | Förster et al. | |

FOREIGN PATENT DOCUMENTS

| | | |
|---|---|---|
| DE | 69815557 T2 | 4/2004 |
| DE | 102008045712 A1 | 4/2011 |
| DE | 102011110047 A1 | 2/2013 |
| DE | 102011113120 A1 | 3/2013 |
| DE | 102012203132 A1 | 8/2013 |
| WO | 2005021347 A1 | 3/2005 |
| WO | 2010025892 A1 | 3/2010 |
| WO | 2012126946 A2 | 9/2012 |
| WO | 2013034692 A1 | 3/2013 |

\* cited by examiner

METHOD FOR BRAKING A RAIL VEHICLE AND OPEN-LOOP AND/OR CLOSED-LOOP CONTROL DEVICE FOR A BRAKE SYSTEM

BACKGROUND OF THE INVENTION

Field of the Invention

The invention relates to a method for braking a rail vehicle by means of a brake system having an open- and/or closed-loop control device, wherein the open- and/or closed-loop control device has a wheel slide protection control unit for ensuring a predefined coefficient of adhesion between the wheels of the rail vehicle and the rail, and wherein brake demand signals of different origin are taken into account by the open- and/or closed-loop control device. The invention also relates to an open- and/or closed-loop control device for a brake system of a rail vehicle, having a wheel slide protection control unit for ensuring a predefined coefficient of adhesion between the wheels of the rail vehicle and the rail, and having signal inputs for a plurality of brake demand signals of different origin. The invention lastly also relates to a corresponding brake system.

DE 10 2008 045 712 A1 describes a method for braking a rail vehicle by means of an electro-pneumatic braking system having a wheel slide protection computer as a controller for ensuring a predefined coefficient of adhesion between the wheels of the rail vehicle and the rail, wherein brake demand signals of different origin, namely by control stand input and by emergency brake demand on the part of the central train control system, are taken into account.

Within the jurisdiction of the International Union of Railways UIC (French: "Union internationale des chemins de fer"), so-called "braking without wheel slide protection" is generally required for braking rail vehicles. In other words, there must be a possibility of braking that is not subject to closed-loop control by anti-skid protection.

The reason for this is that, by virtue of its principle, the wheel slide protection system with its wheel slide protection valves is the last link in the chain from the brake demand to the brake actuators. This is clearly illustrated in the drawing accompanying the above mentioned publication DE 10 2008 045 712 A1.

Erroneous shutoff of the wheel slide protection valves by the wheel slide protection control of the wheel slide protection control unit or a mechanical defect on the wheel slide protection valves could prevent application of the pneumatic brake when required.

The pneumatic wheel slide protection of the brake system used within the jurisdiction of the UIC often has a safety shutdown which prevents impermissible control action after a certain time period (max. 10 s). Within this time period, a fault in the wheel slide protection system may result in complete failure of the pneumatic brake. With this braking mode without slide protection, it is possible for the driver to manually deactivate the wheel slide protection before the safety time has elapsed.

BRIEF SUMMARY OF THE INVENTION

The object of the present invention is to specify a method, an open- and/or closed-loop control device, and a corresponding brake system, for which a braking mode without slide protection is initiated on an alternative basis.

This object is achieved by the features of the independent claims. Advantageous embodiments are set forth in the sub-claims.

For the method according to the invention, it is provided that the wheel slide protection function of the wheel slide protection control unit is deactivated for braking without wheel slide protection if at least two brake demand signals of different origin are simultaneously present, the brake demand of which exceeds a predefined deceleration limit. Each individual brake demand by means of a brake demand signal per se obviously results in a corresponding brake application by means of the brake system. These brake applications are applications for which the wheel slide protection control unit ensures a particular coefficient of adhesion between the wheels of the rail vehicle and the rail.

The advantage of the method according to the invention is that braking without wheel slide protection cannot be brought about by a single operator control action (e.g. actuation of the emergency pushbutton), which is often undesirable.

The wheel slide protection control unit advantageously controls the wheel slide protection valves of the brake system, wherein the wheel slide protection valves act on downstream brake cylinders of the brake system.

The brake system is preferably a pneumatic brake system. The braking is accordingly pneumatic braking and the wheel slide protection is pneumatic wheel slide protection. Alternatively, however, the brake system can also be an electro-hydraulic brake system, a hydraulic brake system, an electromechanical brake system, an electrodynamic brake system (regenerative braking system), etc. having corresponding brake actuators.

According to a preferred embodiment of the invention, the wheel slide protection function of the wheel slide protection control unit is deactivated only if at least two brake demand signals are simultaneously present, the brake demand of which exceeds a respective predefined deceleration limit. In this embodiment there is therefore no alternative possibility for deactivating the wheel slide protection function, or in other words for activating braking without wheel slide protection.

In particular, it is provided that the wheel slide protection control unit is deactivated if at least two brake demand signals each having maximum brake demand are simultaneously present. An emergency braking demand is to be regarded as the maximum brake demand.

According to another preferred embodiment of the invention, it is provided that the brake system has a plurality of brake demand subsystems for brake demand, wherein at least two of the simultaneously present brake demand signals have their origin in different brake demand subsystems of the brake system.

According to another preferred embodiment of the invention, it is provided that the at least two brake demand signals are each transmitted via two mutually independent signal paths to the open- and/or closed-loop control device. In particular, it is provided that the brake demand signals transmitted via the one signal paths are used independently of the brake demand signals transmitted via the respective other signal paths to deactivate the wheel slide protection function of the wheel slide protection control unit.

In the event of two brake demand signals of different origin which are each transmitted via two signal paths, this therefore produces four signal paths, the signals of which are processed in pairs in each case. As a result of the two brake demand signals on each of these two pairs of signal paths, deactivation of the wheel slide protection function of the wheel slide protection control unit can now occur. The two mutually independent pairs of signal paths also allow checking for faults in the brake system, particularly monitoring of the operation of the signal paths.

In another embodiment of the invention, the brake demand signals transmitted via the different signal paths are used for checking for faults in the brake system.

The invention also relates to an open- and/or closed-loop control device for a brake system of a rail vehicle, comprising a wheel slide protection control unit for ensuring a predefined coefficient of adhesion between the wheels of the rail vehicle and the rail, and having signal inputs for a plurality of brake demand signals of different origin. It is provided that the wheel slide protection function of the wheel slide protection control unit can be deactivated, wherein the open- and/or closed-loop control device is designed such that the wheel slide protection function of the wheel slide protection control unit is deactivated if at least two brake demand signals of different origin, the brake demand of which exceeds a respective predefined deceleration limit, are simultaneously present at the signal inputs. The open- and/or closed-loop control device is designed in particular to carry out the above-mentioned method.

According to a preferred embodiment of the invention, said wheel slide protection control unit is implemented as a wheel slide protection control unit for controlling wheel slide protection valves of the brake system which are connected to the open- and/or closed-loop control device. The wheel slide protection valves for their part act on downstream brake cylinders of the brake system.

The invention lastly also relates to a brake system for braking a rail vehicle, having an above-mentioned open- and/or closed-loop control device. Said brake system is—as already mentioned—preferably a pneumatic brake system.

The brake system advantageously has a plurality of brake demand subsystems, wherein at least two of the simultaneously present brake demand signals have their origin in different brake demand subsystems of the brake system.

BRIEF DESCRIPTION OF THE SEVERAL VIEWS OF THE DRAWING

An exemplary embodiment of the invention will now be explained in greater detail with reference to the accompanying drawings in which.

DESCRIPTION OF THE INVENTION

Figure 1:
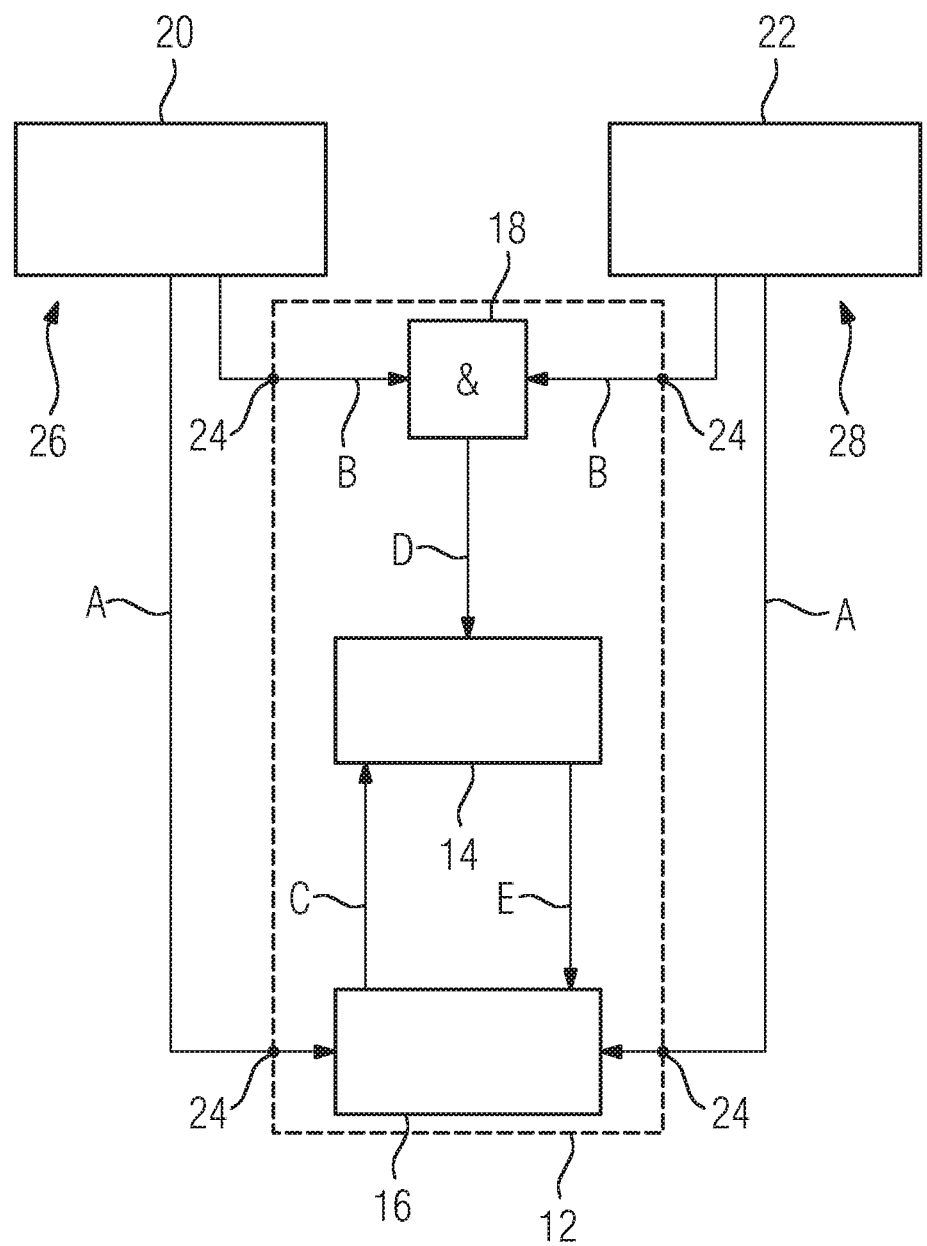
FIG. 1 shows an illustration of the open- and/or closed-loop control method of a brake system.
Figure 2:
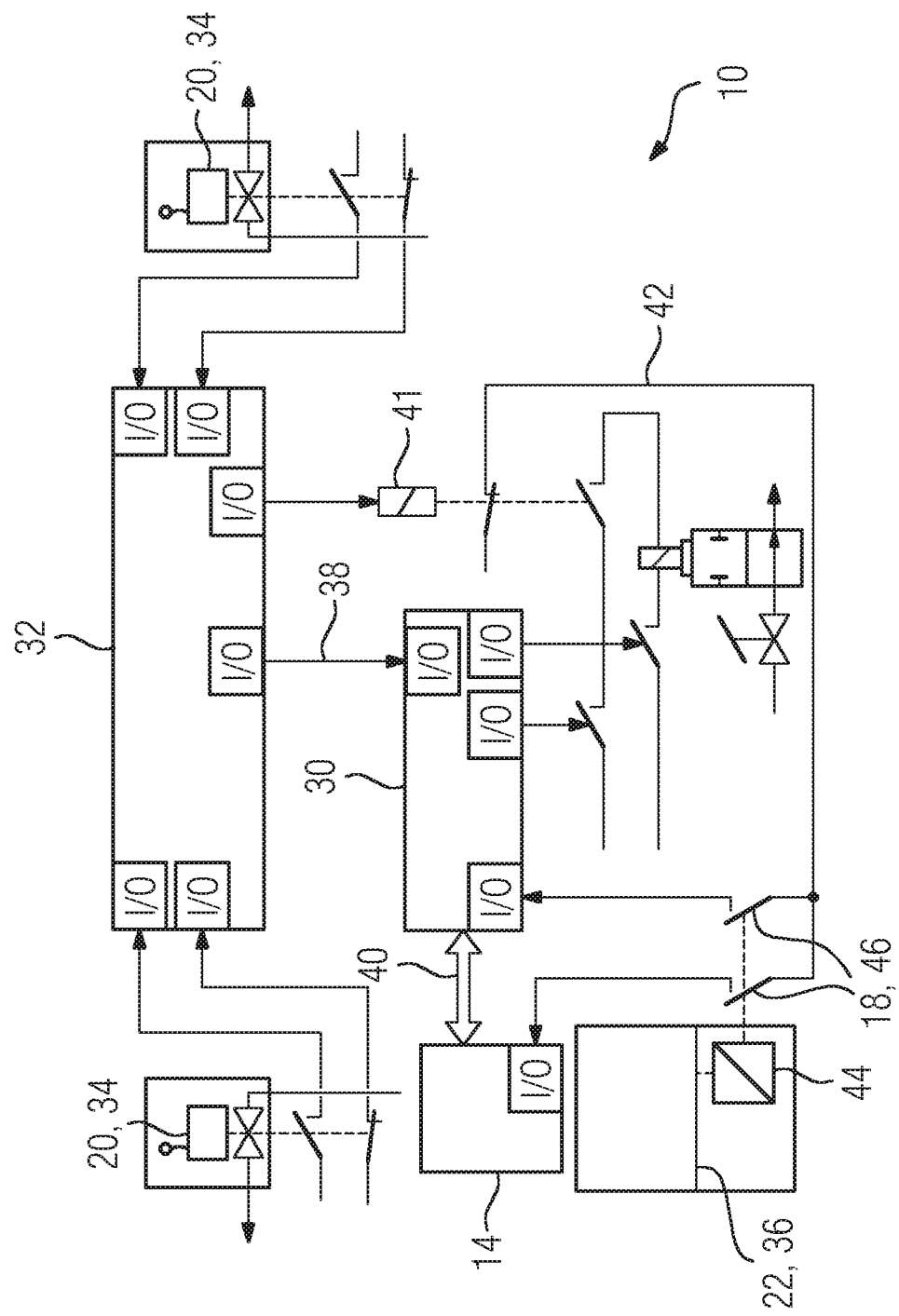
FIG. 2 shows a brake system having an open- and/or closed-loop control device according to a preferred embodiment of the invention.

FIG. 1 schematically illustrates the implementation of operation without wheel slide protection of a brake system 10 of a rail vehicle, as shown specifically in FIG. 2. The essential component of said brake system 10 is an open- and/or closed-loop control device 12. Said open- and/or closed-loop control device 12 comprises a wheel slide protection control unit 14 for ensuring a predefined coefficient of adhesion between the wheels of the rail vehicle and the rail, and a control component 16 for controlling the wheel slide protection control unit 14. Said control component 16 is used to activate/deactivate the wheel slide protection control unit 14 for all types of brake demands. FIG. 1 also shows another component 18 of the open- and/or closed-loop control device 12, which can be used at least to deactivate the wheel slide protection control unit 14.

Also shown in FIG. 1 are an origin 20 of a first brake demand signal and an origin 22 of another (i.e. a second) brake demand signal. Both origins 20, 22 are in the brake system 10, but are not part of the open- and/or closed-loop control device 12. The origins 20, 22 of the brake demands are connected, on the one hand, via first signal paths A to the control component 16 and, on the other hand, via second signal paths B to the other component 18. The brake demand signals are transmitted to the components 16, 18 via these signal paths A, B and to signal inputs 24 of the open- and/or closed-loop control device 12 which are located on the signal paths. The origin 20 of the first brake demand is in a first brake demand subsystem 26 of the brake system 10. The origin 22 of the second brake demand is in a second brake demand subsystem 28 of the brake system 10.

The control component 16 and the other component 18 are then for their part connected to the wheel slide protection control unit 14 via internal control paths C, D carrying electrical signals.

To deactivate the wheel slide protection function, two conditions must now be fulfilled. On the one hand, two brake demand signals of different origin must be present simultaneously and, on the other hand, these brake demand signals must request a sufficiently high deceleration, in this example a maximum deceleration (maximum brake demand).

As the control component 16 controls the activation/deactivation of the wheel slide protection control unit 14 for any kind of brake demand, it checks these two conditions individually. The other component 18, on the other hand, is used exclusively to deactivate the wheel slide protection control unit 14 and therefore simply acts in conjunction with the wheel slide protection as a logical AND element.

Both components 16, 18 output via the corresponding control paths C, D a respective control signal for deactivating the wheel slide protection function for the wheel slide protection control unit 14.

In order to be able to detect a possible fault on the first or the second signal paths A, B, the control signal of the control component 16 is fed out with a time delay with respect to the control signal of the other component 18. The delay can be, for example, approximately one second (~1 s). After deactivation of the wheel slide protection function, the wheel slide protection control unit 14 outputs an indication to the control component 16 via the signal path E that the wheel slide protection function is now deactivated. The latter can detect a possible fault therefrom as follows:

(i) If the control component 16 receives an indication on the path E and corresponding signals on the first signal paths even before it has itself output a control signal to the wheel slide protection control unit 14 via the control path C, the two brake demand signals of different origin 20, 22 are simultaneously present with maximum brake demand and the first and second signal paths A, B are fault-free.

(ii) If the control component 16 receives an indication on the path E without corresponding signals on the first signal paths A, or the signals are present on the first signal paths A without the control component 16 having received an indication on the path E, a fault is therefore present.

FIG. 2 shows a specific embodiment of the brake system 10 comprising the open- and/or closed-loop control device 12 in conjunction with the typical vehicle components of a rail vehicle. The brake system 10 is a pneumatic brake system and the vehicle components are: a vehicle control unit (VCU) 30, a brake control unit (BCU) 32, automatic brake handles (ABH) 34, a wheel slide protection control unit (WSP: Wheel slide protection) 14 and brake components (such as brake lines) 36 of the brake system 10. The vehicle control unit 30, the brake control unit 32, and the wheel slide protection control unit 14 constitute components of the open- and/or closed-loop control device 12.

Operation is as follows:

If a brake handle 34 of the first brake demand subsystem 26 is placed in the emergency braking position and the second brake demand subsystem 28 is actuated to the maximum, the wheel slide protection function of the wheel slide protection control unit 14 is deactivated, resulting in braking without wheel slide protection.

For a vehicle speed greater than 0 km/h, the simultaneous maximum brake demand of both brake demand subsystems 26, 28 is an exceptional situation which only occurs in the event of failure of at least one brake demand subsystem 26, 28 and triggers the following action:

(a) If it is detected that, in spite of the brake demand resulting from placing the brake handle 34 in the emergency braking position (first brake demand subsystem 26), insufficient brake pressure is built up in the brake system 10, most probably an actuating element of the second brake demand subsystem 28 is then being actuated to the maximum.

(b) On the other hand, if it is detected that, in spite of the maximum brake demand by the second brake demand subsystem 28, insufficient brake pressure is built up in the brake system 10, most probably a brake handle 34 of the central train control system (first brake demand subsystem 26) is then being placed in the emergency braking position.

In both cases, two brake demand signals of different origin 20, 22 each with maximum brake demand, are applied to the open- and/or closed-loop control device 12.

The emergency braking position of the brake handle 34 is detected by the brake control unit 32 and conveyed via the signal line 38 to the vehicle control unit 30 communicating with the wheel slide protection control unit 14 by means of the field bus (MVB bus) 40. A corresponding status signal is applied to a signal line 42 by means of a contactor 41 which can be connected both to the vehicle control unit 30 and to the wheel slide protection control unit 14. The brake handles 34 are therefore the origin 20 of the first brake demand signal.

The maximum actuation of the independent brake is detected by means of a pressure monitor or switch 44 on a pressure line 36. The setting of the pressure monitor or switch 44 controls the signal flow in the signal lines 42 from the brake control unit 32 to the wheel slide protection control unit 14 and the vehicle control unit 30 via controllable switches 46. The pressure monitor or switch 44 is therefore the origin 22 of the second brake demand signal. The controllable switches 46 constitute (among other things) the component 18.

If the emergency braking position of the brake handle 34 is detected, said position to be taken as the maximum brake demand, and the corresponding brake demand signal is applied to the signal line 42 and if the signal line 42 is enabled by the brake demand signal of the independent brake via the switches 46, the wheel slide protection control unit 14, and also the vehicle control unit 30, receives a corresponding signal. In response to the direct signal on the signal line 42 (corresponding to path D) and of a signal stimulated by this signal on the field bus 40 (corresponding to path C), the wheel slide protection control unit 14 then switches off the wheel slide protection function, resulting in braking of the rail vehicle without wheel slide protection. The vehicle control unit 30 monitors the correct transmission and processing of the brake demand signals by receiving indications from the wheel slide protection control unit 14 via the field bus 40 and generates a diagnostic signal in the event of a fault.

The invention claimed is:

1. A method for braking a rail vehicle, the method comprising the following steps:
   providing a brake system having a control device for at least one of open-loop or closed-loop control;
   providing the control device with a wheel slide protection control unit for ensuring a predefined coefficient of adhesion between wheels of the rail vehicle and a rail;
   taking brake demand signals of different origin into account in the control device; and
   deactivating a wheel slide protection function of the wheel slide protection control unit to provide braking without wheel slide protection 4 in response to determining that at least two brake demand signals, having different origin and having a brake demand exceeding a respective predefined deceleration limit, are simultaneously present.

2. The method according to claim 1, which further comprises deactivating the wheel slide protection function of the wheel slide protection control unit in response to determining that at least two brake demand signals having different origin and having a brake demand exceeding a respective predefined deceleration limit, are simultaneously present.

3. The method according to claim 1, which further comprises deactivating the wheel slide protection control unit in response to determining that at least two brake demand signals having different origin and each having a maximum brake demand, are simultaneously present.

4. The method according to claim 1, wherein the brake system has a plurality of brake demand subsystems, and at least two of the simultaneously present brake demand signals have their origin in different brake demand subsystems of the brake system.

5. The method according to claim 1, which further comprises transmitting the at least two brake demand signals over two mutually independent signal paths to the control device.

6. The method according to claim 5, which further comprises using the brake demand signals transmitted over the different signal paths independently of one another to deactivate the wheel slide protection function of the wheel slide protection control unit.

7. The method according to claim 5, which further comprises using the brake demand signals transmitted over the different signal paths to check for faults in the brake system.

8. A control device for at least one of open-loop or closed-loop control for a brake system of a rail vehicle, the open-loop and/or closed-loop control device comprising:
   a wheel slide protection control unit for ensuring a predefined coefficient of adhesion between wheels of the rail vehicle and a rail; and
   signal inputs for providing a plurality of brake demand signals of different origin to said wheel slide protection control unit;
   said wheel slide protection control unit having a wheel slide protection function being deactivated in response to determining that at least two brake demand signals having different origin and having a brake demand exceeding a respective predefined deceleration limit, are simultaneously present at said signal inputs.

9. The device according to claim 8, wherein said wheel slide protection control unit is a wheel slide protection control unit for controlling wheel slide protection valves of the brake system being connected to the control device, and the wheel slide protection valves act on downstream brake cylinders of the brake system.

10. A system for braking a rail vehicle, the system comprising:

a brake system of the rail vehicle, the brake system including a control device for at least one of open-loop or closed-loop control for the brake system of the rail vehicle, the open-loop and/or closed-loop control device comprising:

a wheel slide protection control unit for ensuring a predefined coefficient of adhesion between wheels of the rail vehicle and a rail; and signal inputs for providing a plurality of brake demand signals of different origin to said wheel slide protection control unit;

said wheel slide protection control unit having a wheel slide protection function being deactivated in response to determining that at least two brake demand signals having different origin and having a brake demand exceeding a respective predefined deceleration limit, are simultaneously present at said signal inputs.

11. The system according to claim 10, wherein the brake system includes a plurality of brake demand subsystems, at least two of the simultaneously present brake demand signals having their origin in different brake demand subsystems of the brake system.

* * * * *